United States Patent [19]

Achelpohl

[11] Patent Number: 4,589,183

[45] Date of Patent: May 20, 1986

[54] METHOD AND APPARATUS FOR UNDOING THE INTERCONNECTION BETWEEN STAMPED STACKS OF BAGS

[75] Inventor: Fritz Achelpohl, Lengerich, Fed. Rep. of Germany

[73] Assignee: Windmoller & Holscher, Lengerich, Fed. Rep. of Germany

[21] Appl. No.: 644,280

[22] Filed: Aug. 27, 1984

[30] Foreign Application Priority Data

Aug. 29, 1983 [DE] Fed. Rep. of Germany ....... 3331069

[51] Int. Cl.4 ............................................ B23P 19/00

[52] U.S. Cl. .................................... 29/426.5; 29/239; 225/98

[58] Field of Search ................ 29/426.5, 426.6, 426.3, 29/239; 225/98

[56] References Cited

U.S. PATENT DOCUMENTS

| | | | |
|---|---|---|---|
| 3,401,446 | 9/1968 | Obeda et al. | 29/426.5 |
| 3,728,772 | 4/1973 | Coffman | 29/239 |
| 4,195,758 | 4/1980 | Morgan | 225/98 |
| 4,441,844 | 4/1984 | Miller | 29/239 X |

FOREIGN PATENT DOCUMENTS 2915689 10/1980 Fed. Rep. of Germany .

*Primary Examiner*—Frank T. Yost
*Attorney, Agent, or Firm*—Fleit, Jacobson, Cohn & Price

[57] ABSTRACT

To undo the interconnection caused at cut edges of stacks of plastics bags that have been stamped, at least those zones of each stack where stamping has taken place are continuously bent over at least one supporting edge by being pulled thereover.

2 Claims, 2 Drawing Figures

Figure 1:
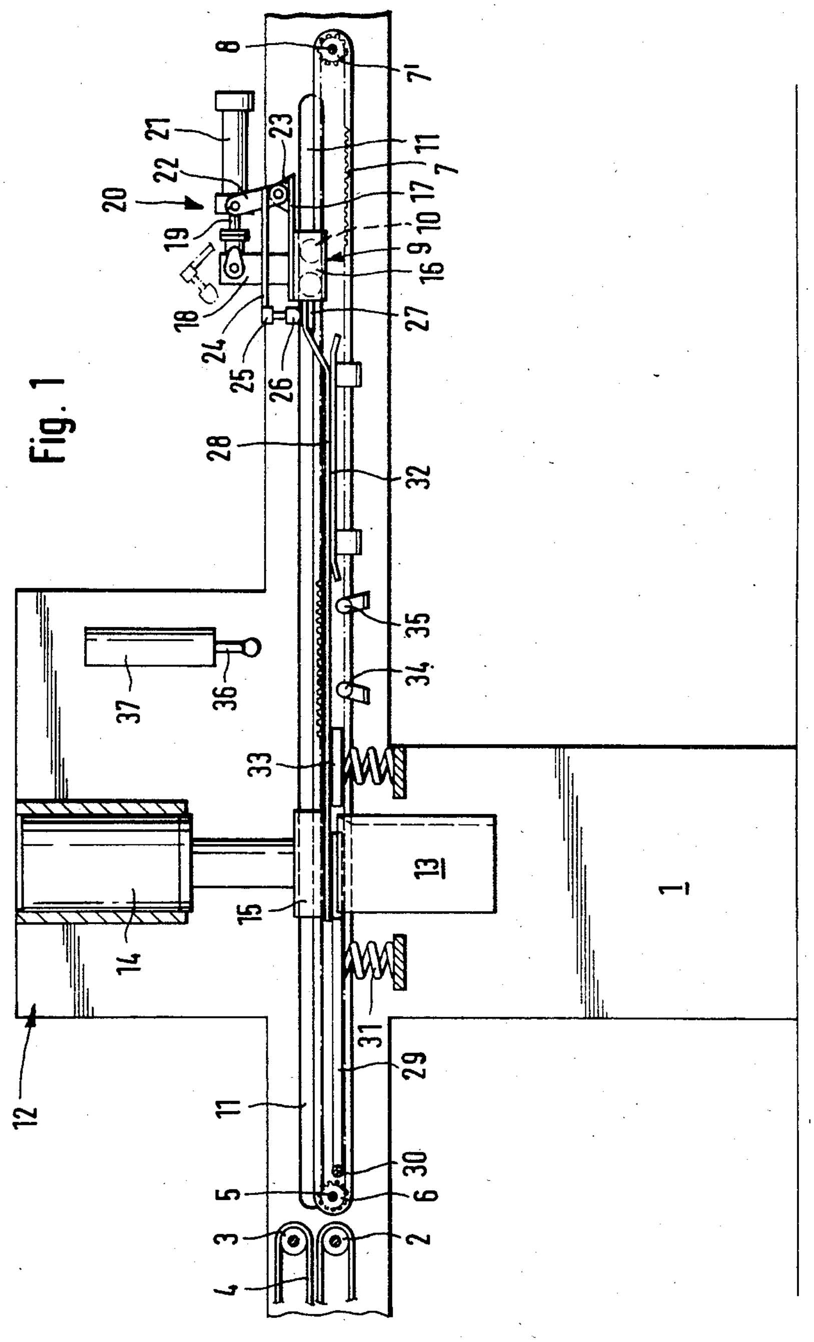

METHOD AND APPARATUS FOR UNDOING THE INTERCONNECTION BETWEEN STAMPED STACKS OF BAGS

The invention relates to a method of undoing the interconnection at the cut edges by stamping stacks of flattened workpieces of thermoplastic material, preferably plastics bags, as well as an apparatus for performing this method.

So-called vest bags are for example made in the manner described in DE-OS No. 29 15 689 in that the vest cut-outs are stamped out of stacks of tube sections which are provided with side folds and are provided at the end with transverse weld seams. It has been found in practice that during the appropriate stamping cuts the individual bags in the stack become connected to each other in the zone of the cut edges. This interconnection is disruptive when removing bags from the stack and also when opening the individual bags. Undesirable interconnections between stacked plastics bags can also arise when, for example, the stack is provided with stamped-out hand holes.

It is therefore the problem of the invention to provide a simple way of eliminating the interconnections in the stacks of stamped workpieces of thermoplastic material after stamping.

According to the invention, this problem is solved in a method of the aforementioned kind in that the stacks are engaged at their leading ends and, after stamping, at least the trailing zones containing the stamped-out recesses are continuously bent whilst being pulled over at least one supporting edge. By reason of the curvature of the individual bags that increases in radius with an increase in the distance from the supporting edge, the bags in the stack are moved relatively to each other and this, supported by the flexure produced by continuous bending of the stack, leads to elimination of the interconnection of the cut edges.

An apparatus known for example from DE-OS No. 29 15 689 is developed in accordance with the present invention for the purpose of performing the method of the invention in that the conveying means consist of a carriage with clamping jaws clamping the stack to be stamped, the carriage being movable between its stack-receiving and stack-discharging positions, and that behind the stamping tool as viewed in the conveying direction of the carriage two bars are disposed beneath the conveying plane of the stack transversely to the conveying direction, between which there can be introduced a raisable and lowerable bar which intersects the conveying plane. If after stamping the raisable and lowerable bar is lowered between the fixed bars, the stamped block of bags is pulled by the carriage in a double S formation between the direction-changing edges formed by the bars, so that interconnected cut edges are separated by appropriate flexing of the stack and the relative displacement of the individual layers in the stack resulting therefrom.

Figure 2:
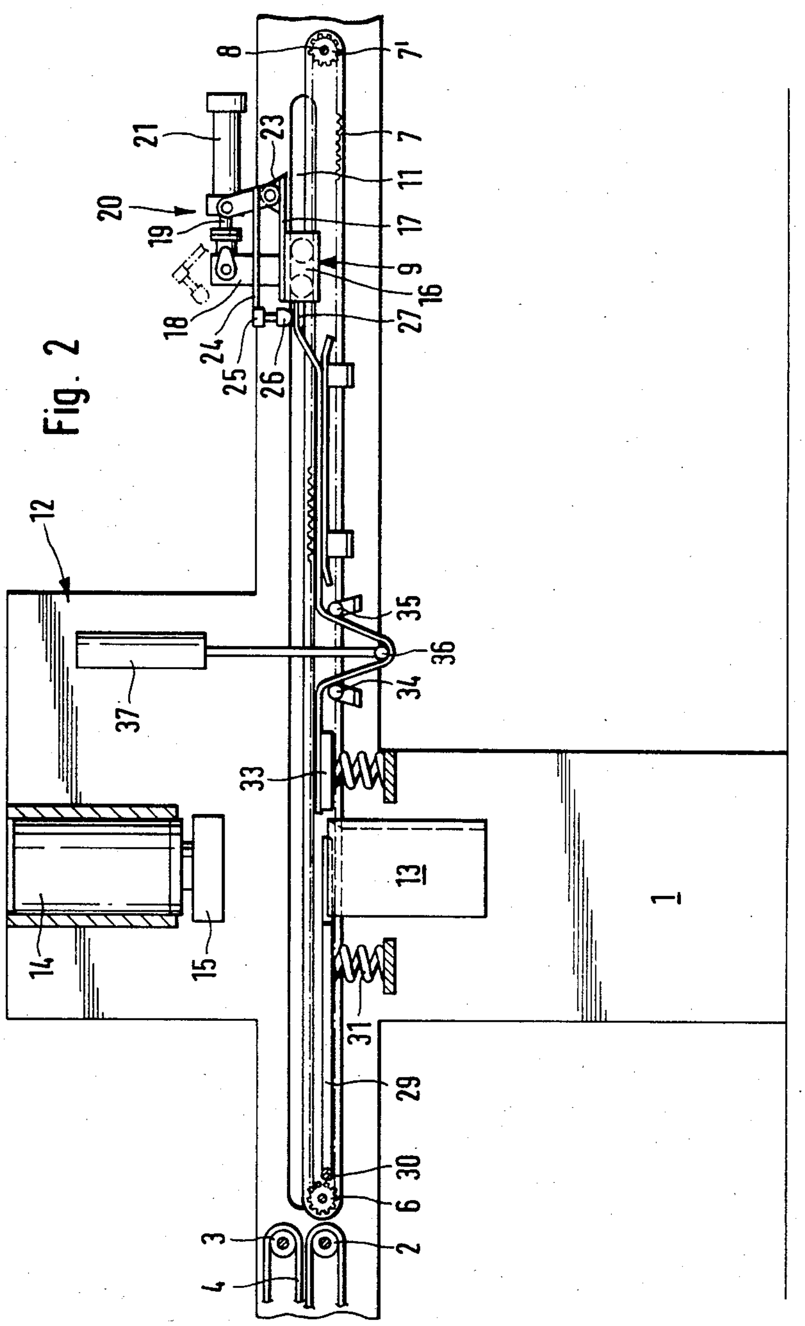

An example of the invention will now be described in more detail with reference to the drawing, wherein:

FIG. 1 shows the equipment of the invention directly prior to the stamping step, and FIG. 2 illustrates the equipment of FIG. 1 after stamping, with the stack of bars pulled out of the stamping zone.

The apparatus consists of two spaced and parallel side frames 1 of which only the rear frame is illustrated.

Between the two side frames 1 there are mounted the end direction-changing rollers 2 and 3 of a supply conveyor belt 4 by means of which a stack of bags can be supplied. Adjacent to the lower direction-changing roller 2 there is a shaft 5 carrying a pulley 6 at both ends. Two toothed belts 7 are placed about these two pulleys 6 and, in addition to the pulleys 6, are slung about pulleys 7′ seated at the ends of a further shaft 8. One of the shafts 5 or 8 is mounted to be driven in a manner not shown.

Secured to the upper run of the toothed belt 7 there is a carriage 9 of which the rollers 10 are displaceably mounted in lateral guide slots 11 of the side frames 1. Stamping means 12 provided between the two toothed belts in the vicinity of the direction-changing rollers 2, 3 of the supply belt 4 consists of a lower fixed counter-knife 13 and an upper stamp 15 which is actuated by a piston-cylinder unit 14. With the stamp 15 raised, the carriage 9 can be moved between the stamp 15 and counter-knife 13.

It will be clear from the drawings that the carriage 9 consists of a basic frame 16 having an upper supporting plate 17. A holder 18 welded to this supporting plate 17 has its upper end hinged to the piston rod 19 of a piston-cylinder unit 20. The cylinder 21 of this piston-cylinder unit 20 is connected by a link 22 to a console 23 welded to the supporting plate 17. Secured to the link 22 there are two spaced levers 24 carrying a cross-member 25. Screwed into this cross-member 25 there are a plurality of downwardly projecting clamping pins 26. In the full line position, these clamping pins are supported by a counter-holder 27 which is fixed to the frame 16 of the carriage 9.

When pressure is exerted on the piston-cylinder unit 20, the clamping pins 26 move to the raised position shown in broken lines. If, now, a stack of bags is brought up by the supply belt 4, the carriage 19 moves through between the raised stamp 15 and the fixed counter-knife 13 towards the left-hand side up to just in front of the end of the supply belt 4. After raising the clamping pins 26, the packet of bags is moved by the supply belt 4 to have its leading end disposed between the counter-holder 27 and the clamping pin 26, whereafter the clamping pins 26 are closed.

Thereafter, the carriage 9 moves to the FIG. 1 position so that the rear end of the stack 28 of bags is disposed between the fixed counter-knife 13 and the stamp 15. The spacing between the fixed counter-knife 13 and the end of the conveyor belt 4 on the downstream side is bridged by a supporting table 29 which is mounted to rotate about the shaft 30 and has its other end supported on a spring 31. The end of the supporting table 29 remote from the shaft 30 partially engages around the counter-knife 13 and serves as an ejector after the stamping step.

In the FIG. 2 position, the stack 28 of bags is supported between the carriage 9 and the stamping means 12 by a fixed table 32 and a table 33 which can be lowered against spring force. Two round profiles 34, 35 parallel to each other at a spacing are provided between the two tables 32 and 33 and are connected to the side frames 1. In the gap formed by these two round profiles 34 and 35 transverse to the conveying direction one can introduce a pressure bar 36 with the aid of two piston-cylinder units 37 so that the stack assumes the FIG. 2 position after the pressure bar has been introduced in the gap. When this has occurred, the carriage moves to the right from the FIG. 2 position up to the end of the guide slot 11, whereby the stack is flexed by the two round profiles 34 and 35 and the pressure bar 36. Such flexing causes relative movement between the individual bags of the stack, whereby the interconnection brought about by the cold stamping step is eliminated.

I claim:

1. A method of undoing the interconnection caused at the cut edges by stamping stacks of flattened workpieces of thermoplastic material, preferably plastics bags, characterized in that leading ends of the stacks are engaged and, after stamping, at least trailing zones containing stamped-out recesses are continuously bent whilst being pulled over at least one supporting edge.

2. Apparatus for undoing an interconnection caused at cut edges of stamped stacks of flattened workpieces of thermoplastic material, preferably plastic bags, said apparatus comprising:

conveying means for transporting the stacks between opposed stamping tools, said conveying means including carriage means with clamping jaws for clamping a stack of workpieces to be stamped, the carriage means being movable between a stack-receiving position and a stack-discharging position, two bars located downstream from said opposed stamping tools in the conveying direction of said carriage means and being disposed beneath a conveying plane of the stack, and being oriented transverse to the conveying direction, and a raisable and lowerable bar intersecting the conveying plane between said two bars for flexing of the stack and relative displacement of individual layers of the stack resulting in separation of the individual layers from each other.

* * * * *